US012215789B2

(12) United States Patent
Ando et al.

(10) Patent No.: US 12,215,789 B2
(45) Date of Patent: Feb. 4, 2025

(54) LABYRINTH SEAL AND GAS TURBINE

(71) Applicant: KAWASAKI JUKOGYO KABUSHIKI KAISHA, Kobe (JP)

(72) Inventors: Takahiro Ando, Kobe (JP); Shoichi Shimomura, Kobe (JP); Naoya Tanabashi, Kobe (JP); Shinya Makino, Kobe (JP); Masahiro Yamamoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/909,820

(22) PCT Filed: Mar. 10, 2021

(86) PCT No.: PCT/JP2021/009564
§ 371 (c)(1),
(2) Date: Sep. 7, 2022

(87) PCT Pub. No.: WO2021/199992
PCT Pub. Date: Oct. 7, 2021

(65) Prior Publication Data
US 2024/0200663 A1      Jun. 20, 2024

(30) Foreign Application Priority Data

Mar. 31, 2020   (JP) .................... 2020-064024

(51) Int. Cl.
*F16J 15/447*      (2006.01)
*F01D 11/02*       (2006.01)
(52) U.S. Cl.
CPC ......... *F16J 15/4472* (2013.01); *F01D 11/02* (2013.01); *F16J 15/447* (2013.01)

(58) Field of Classification Search
CPC . F01D 11/02; F16J 15/44; F16J 15/447; F16J 15/4472
See application file for complete search history.

(56) References Cited

U.S. PATENT DOCUMENTS 4,273,510 A  *  6/1981  Ambrosch ........... F16J 15/4472
                                           415/110
4,370,094 A  *  1/1983  Ambrosch ........... F16J 15/4472
                                           415/173.6

(Continued)

FOREIGN PATENT DOCUMENTS

| JP | 2002-228014 A | 8/2002 |
| JP | 2013-221512 A | 10/2013 |
| JP | 2019-049346 A | 3/2019 |

OTHER PUBLICATIONS

International Search Report for PCT/JP2021/009564, dated Apr. 13, 2021.

*Primary Examiner* — Nicholas L Foster
(74) *Attorney, Agent, or Firm* — Sughrue Mion, PLLC

(57) ABSTRACT

A labyrinth seal according to one aspect of the present disclosure includes: a first structure including seal fins located at intervals in an axial direction; and a second structure opposed to the first structure, a radial gap being between each seal fin and the second structure. The second structure is such that when each seal fin is regarded as a reference, a portion of the second structure which is located downstream of the seal fin does not overlap the seal fin in the axial direction. The second structure includes an inlet wall located upstream of a most upstream one of the seal fins, a radial gap being between the inlet wall and the first structure.

5 Claims, 2 Drawing Sheets

(56) References Cited

U.S. PATENT DOCUMENTS

| | | | | |
|---|---|---|---|---|
| 4,420,161 | A * | 12/1983 | Miller | F01D 25/04 |
| | | | | 415/230 |
| 8,864,443 | B2 * | 10/2014 | Narita | F01D 11/22 |
| | | | | 415/113 |
| 9,291,061 | B2 | 3/2016 | Chouhan et al. | |
| 10,718,434 | B2 * | 7/2020 | Nishikawa | F01D 11/025 |
| 11,060,615 | B2 * | 7/2021 | Morinaka | F16J 15/44 |
| 11,136,897 | B2 * | 10/2021 | Tsukuda | F01D 11/005 |
| 11,441,442 | B2 * | 9/2022 | Jouy | F01D 11/122 |
| 2012/0014778 | A1 * | 1/2012 | Narita | F01D 11/22 |
| | | | | 415/174.5 |
| 2012/0027582 | A1 * | 2/2012 | Natarajan | F16J 15/445 |
| | | | | 277/579 |
| 2013/0272888 | A1 | 10/2013 | Chouhan et al. | |
| 2018/0355979 | A1 * | 12/2018 | Nishikawa | F01D 5/225 |
| 2019/0072185 | A1 | 3/2019 | Morinaka | |
| 2019/0136863 | A1 * | 5/2019 | Morinaka | F04D 29/10 |
| 2019/0162074 | A1 | 5/2019 | Seshadri et al. | |
| 2020/0040752 | A1 * | 2/2020 | Tsukuda | F16J 15/4472 |
| 2020/0095882 | A1 | 3/2020 | Jouy et al. | |
| 2023/0145667 | A1 * | 5/2023 | Ando | F16J 15/447 |
| | | | | 277/412 |

* cited by examiner

LABYRINTH SEAL AND GAS TURBINE

CROSS REFERENCE TO RELATED APPLICATIONS

This application is a National Stage of International Application No. PCT/JP2021/009564 filed Mar. 10, 2021, claiming priority based on Patent Japanese Application No. 2020-064024 filed Mar. 31, 2020, the entire contents of which are incorporated in their entirety.

TECHNICAL FIELD

The present disclosure relates to a labyrinth seal and a gas turbine.

BACKGROUND ART

In rotary machines, such as gas turbines, a labyrinth seal may be located between a rotary body and a stationary body to prevent a gas from passing and leaking through between the rotary body and the stationary body. The labyrinth seal is effective in that: obstacles, such as seal fins, are located in a gap between the rotary body and the stationary body to stop the flow of the gas: and in addition, the labyrinth seal has such a configuration that the vortex of the gas is generated inside the labyrinth seal. By the generation of the vortex, the gas further hardly flows in an axial direction, and this can suppress a leakage amount of gas.

In the labyrinth seal described in PTL 1 below, the seal fins are located at a first structure (the rotary body or the stationary body), and small projections are located at a second structure (the rotary body or the stationary body) opposed to the first structure. Each projection is located between the seal fins adjacent to each other in the axial direction. To be specific, the seal fins and the projections are located alternately. By this configuration of the labyrinth seal, the gas having passed through the seal fin collides with the projection to generate the vortex, and this can suppress the leakage amount.

CITATION LIST

Patent Literature

PTL 1: Japanese Laid-Open Patent Application Publication No. 2019-49346

SUMMARY OF INVENTION

Technical Problem

Herein, when assembling the second structure to the first structure in PTL 1 (one of the structures is the rotary body, and the other is the stationary body), this assembling can be easily performed by, for example, inserting the second structure into the first structure in the axial direction (see FIG. 4 in PTL 1). However, to insert the second structure into the first structure in the axial direction, the labyrinth seal needs to be configured such that the seal fins and the projections are prevented from contacting each other at the time of the insertion. To be specific, the heights of the seal fins need to be lowered, or the heights of the projections need to be lowered.

However, if the heights of the seal fins are lowered, the gas easily passes through the seal fins and flows to a downstream side. On the other hand, if the heights of the projections are lowered, the generation of the strong vortex cannot be realized. To be specific, problems remain in both cases. As above, according to the labyrinth seal which can be assembled by inserting the rotary body into the stationary body in the axial direction, the shape of the labyrinth seal is limited. Therefore, it is not easy to effectively suppress the leakage amount of gas.

The present disclosure was made under these circumstances, and an object of the present disclosure is to provide a labyrinth seal and a gas turbine, each of which can be assembled by inserting a rotary body into a stationary body in an axial direction and can effectively suppress a leakage amount of gas.

Solution to Problem

A labyrinth seal according to one aspect of the present disclosure includes: a first structure including seal fins located at intervals in an axial direction; and a second structure opposed to the first structure, a radial gap being between each seal fin and the second structure. The second structure is such that when each seal fin is regarded as a reference, a portion of the second structure which is located downstream of the seal fin does not overlap the seal fin in the axial direction. The second structure includes an inlet wall located upstream of a most upstream one of the seal fins, a radial gap being between the inlet wall and the first structure.

According to this configuration, for example, when the first structure is located at the rotary body, and the second structure is located at the stationary body, portions of the first structure and portions of the second structure do not contact each other by inserting the rotary body into the stationary body toward the upstream side at the time of the assembling. Moreover, the gas having passed through the gap between the inlet wall and the first structure collides with the most upstream seal fin and then flows along the seal fin. With this, a large vortex of the gas is generated in a space between the inlet wall and the most upstream seal fin, and this suppresses the flow in the axial direction. In addition, the assembling can be performed without unnecessarily increasing the dimension of the gap between the inlet wall and the first structure. Therefore, the above labyrinth seal can be assembled by inserting the rotary body into the stationary body in the axial direction, and a leakage amount of gas can be effectively suppressed.

Moreover, a gas turbine according to one aspect of the present disclosure includes the above labyrinth seal.

Advantageous Effects of Invention

The present disclosure can provide a labyrinth seal and a gas turbine, each of which can be assembled by inserting a rotary body into a stationary body in an axial direction and can effectively suppress a leakage amount of gas.

DESCRIPTION OF EMBODIMENTS

Embodiment 1

Hereinafter, embodiments of the present disclosure will be described. First, a labyrinth seal 100 according to Embodiment 1 will be described.

Figure 1:
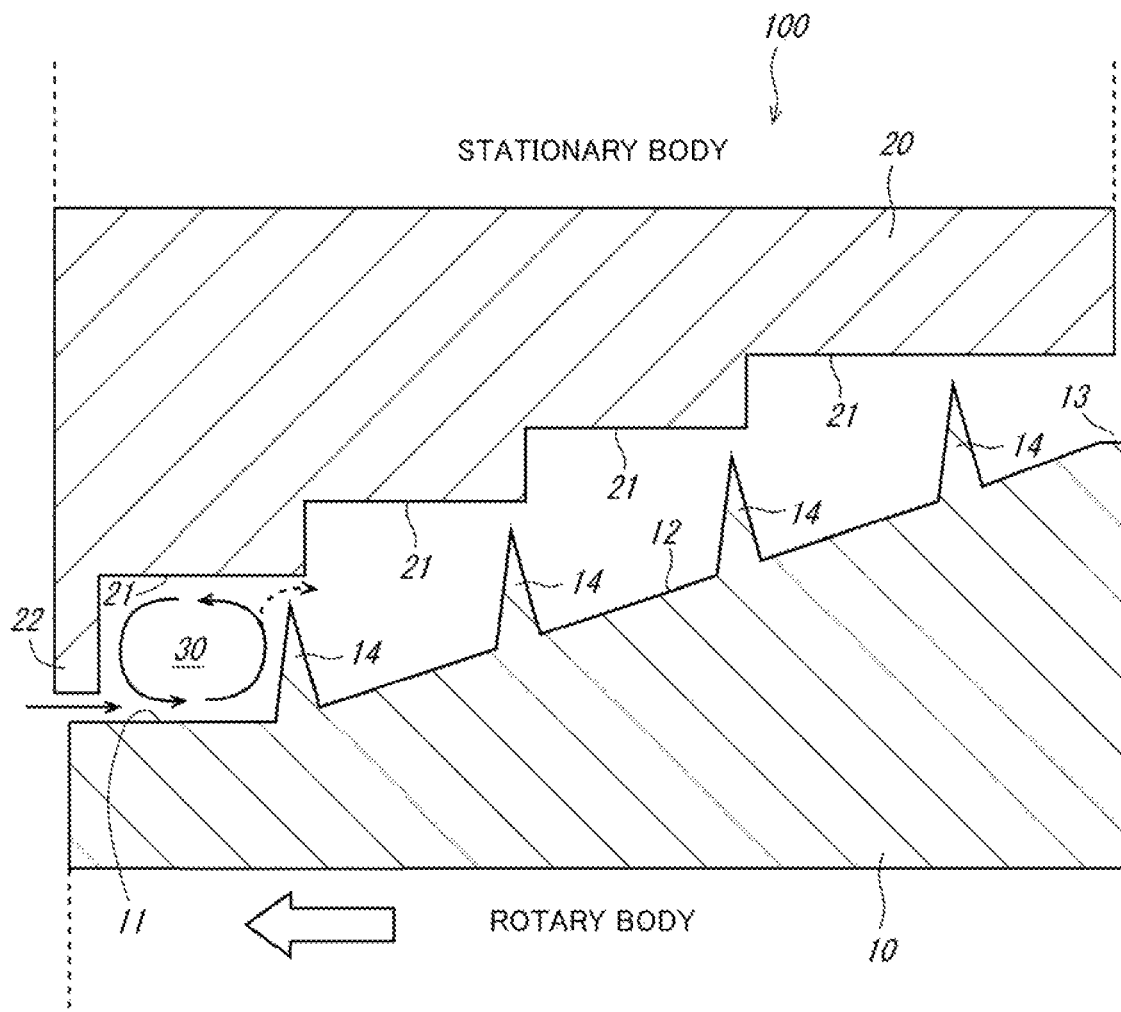
FIG. 1 is a sectional view of a labyrinth seal according to Embodiment 1.

FIG. 1 is a sectional view of the labyrinth seal 100 according to Embodiment 1. The labyrinth seal 100 is located at a rotary machine, such as a gas turbine. More specifically, the labyrinth seal 100 is located between a stationary body, such as a casing, and a rotary body, such as a shaft. Therefore, the labyrinth seal 100 has an annular shape.

In FIG. 1, a paper surface left-right direction is an axial direction of the labyrinth seal 100, and a paper surface upper-lower direction is a radial direction of the labyrinth seal 100. Moreover, a paper surface upper side is a radially outer side of the labyrinth seal 100, and a paper surface lower side is a radially inner side of the labyrinth seal 100. Furthermore, in FIG. 1, a paper surface left side is a high pressure side, and a paper surface right side is a low pressure side. To be specific, a gas flows from the paper surface left side to the paper surface right side. Thus, the paper surface left side is an upstream side of the gas, and the paper surface right side is a downstream side of the gas.

As shown in FIG. 1, the labyrinth seal 100 according to the present embodiment includes a first structure 10 and a second structure 20. In the present embodiment, the first structure 10 is located on an outer peripheral portion of the rotary body, and the second structure 20 is located on an inner peripheral portion of the stationary body. Hereinafter, the first structure 10 and the second structure 20 will be described in order.

First Structure

The first structure 10 is located on the outer peripheral portion of the rotary body as described above and has a cylindrical shape. The first structure 10 includes an inlet surface 11, an inclined surface 12, an outlet surface 13, and seal fins 14.

The inlet surface 11 is a portion located at a most upstream side of the first structure 10 and is located upstream of a most upstream one of the seal fins 14. The inlet surface 11 of the present embodiment extends in parallel with the axial direction. To be specific, a radial position of the inlet surface 11 in the axial direction is constant.

The inclined surface 12 is a portion located downstream of the inlet surface 11 and adjacent to the inlet surface 11. In the present embodiment, the inclined surface 12 is inclined such that a downstream portion thereof is located at the radially outer side of an upstream portion thereof. In a sectional view; the inclined surface 12 of the present embodiment is inclined linearly but may be inclined stepwise. Moreover, in a sectional view; the inclined surface 12 may have a curved shape or a shape that is a combination of a linear shape and a curved shape.

The outlet surface 13 is a portion located downstream of the inclined surface 12 and adjacent to the inclined surface 12. The outlet surface 13 is located at a most downstream side of the first structure 10 and is located downstream of a most downstream one of the seal fins 14. In the present embodiment, a radial position of the outlet surface 13 in the axial direction is constant. However, the radial position of the outlet surface 13 in the axial direction does not have to be constant.

The seal fins 14 are portions extending from the first structure 10 toward the second structure 20. A radial gap is between each seal fin 14 and the second structure 20. The seal fins 14 are located on the inclined surface 12. The seal fins 14 may extend in the radial direction or may extend in a direction inclined relative to the radial direction. The seal fins 14 are located at intervals in the axial direction. In the present embodiment, the seal fins 14 are located at regular intervals in the axial direction.

In a sectional view; a tip of the seal fin 14 has an acute angle. However, the shape of the tip of the seal fin 14 is not limited to this. Moreover, the seal fins 14 of the present embodiment are the same in shape and size as each other. However, the shape and size of the seal fin 14 are not especially limited. Furthermore, the first structure 10 of the present embodiment includes four seal fins 14. However, the number of seal fins 14 included in the first structure 10 is not especially limited.

Second Structure

The second structure 20 is a structure opposed to the first structure 10. The second structure 20 is located on the inner peripheral portion of the stationary body and has a cylindrical shape. The second structure 20 includes step surfaces 21 and an inlet wall 22.

The step surfaces 21 are located so as to correspond to the above-described seal fins 14. Therefore, the step surfaces 21 are opposed to the respective seal fins 14. A radial gap is between each step surface 21 and each seal fin 14. Moreover, the second structure 20 of the present embodiment includes four step surfaces 21, the number of which is equal to the number of seal fins 14. However, the number of step surfaces 21 included in the second structure 20 is not especially limited.

Moreover, the step surfaces 21 extend in parallel with the axial direction. To be specific, a radial position of each step surface 21 in the axial direction is constant. Furthermore, the step surface 21 that is located at the downstream side is located at the radially outer side. Therefore, the entirety of the step surfaces 21 is inclined so as to be located at the radially outer side as it extends toward the downstream side.

The inlet wall 22 is located at a most upstream one of the step surfaces 21 and is located upstream of the most upstream seal fin 14. In the present embodiment, the inlet wall 22 is located at a position opposed to the inlet surface 11 of the first structure 10. Moreover, a radial gap is between the inlet wall 22 and the first structure 10 (inlet surface 11).

As described above, the radial position of the inlet surface 11 in the axial direction is constant. Therefore, even when the relative positions of the first structure 10 and the second structure 20 in the axial direction slightly deviate from each other, the dimension of the radial gap between the inlet wall 22 and the inlet surface 11 does not change and is maintained constant.

Moreover, the dimension of the radial gap between the inlet wall 22 and the first structure 10 (inlet surface 11) is larger than the dimension of the radial gap between the seal fin 14 and the second structure 20 (step surface 21). A radial dimension of the inlet wall 22 is not less than two thirds of a radial distance between the first structure 10 (inlet surface 11) and the second structure 20 (most upstream step surface 21) in a region located downstream of the inlet wall 22 and adjacent to the inlet wall 22. The inlet wall 22 is configured as above because of the flow of the gas described below:

Herein, the flow of the gas passing through between the first structure 10 and the second structure 20 will be described. First, a space 30 between the inlet wall 22 and the most upstream seal fin 14 is referred to as a "first space." In this case, a gas inlet of the first space 30 is the radial gap between the inlet wall 22 and the first structure 10 and is located at the radially inner side of the first space 30. On the other hand, a gas outlet of the first space 30 is the radial gap between the most upstream seal fin 14 and the second structure 20 and is located at the radially outer side of the first space 30.

As above, the gas inlet and the gas outlet of the first space 30 are located at opposite sides across a middle of the first space 30, and the outlet is located farthest from the inlet. Then, as shown in FIG. 1, the gas having passed through the gap between the inlet wall 22 and the first structure 10 which is the inlet of the first space 30 flows in the axial direction and then collides with the seal fin 14. Then, the gas flows along the seal fin 14, and this generates a large vortex in the first space 30. This vortex becomes the mainstream of the gas, and this can suppress the flow (arrow shown by a broken line in FIG. 2) of the gas passing through the outlet of the first space 30.

The flow of the gas is described as above. As described above, the radial dimension of the inlet wall 22 is not less than two thirds of the radial distance between the inlet surface 11 and the most upstream step surface 21. By this configuration, the gas passing through between the inlet wall 22 and the first structure 10 can be directed in the axial direction, and therefore, the vortex can be generated in the first space 30.

Moreover, the inlet wall 22 is located such that there is a predetermined interval between the inlet wall 22 and the most upstream seal fin 14 in the axial direction. In the present embodiment, an axial distance between the inlet wall 22 and the most upstream seal fin 14 is equal to an axial distance between the adjacent seal fins 14. By this configuration, the vortex of the gas can be efficiently generated between the inlet wall 22 and the most upstream seal fin 14 as described below: However, the axial distance between the inlet wall 22 and the most upstream seal fin 14 may be different from the axial distance between the adjacent seal fins 14.

Moreover, the second structure 20 is such that when each seal fin 14 is regarded as a reference, a portion of the second structure 20 which is located downstream of the seal fin 14 does not overlap the seal fin 14 when viewed in the axial direction. For example, when the most upstream seal fin 14 is regarded as a reference, a portion of the second structure 20 which is located downstream of the most upstream seal fin 14 is located at the radially outer side of the most upstream seal fin 14. Therefore, when viewed in the axial direction, the portion of the second structure 20 which is located downstream of the most upstream seal fin 14 does not overlap the most upstream seal fin 14. The same is true when any of the seal fins 14 is regarded as a reference.

The second structure 20 of the present embodiment is configured as above. Therefore, when inserting the rotary body into the stationary body in the axial direction to assemble the stationary body and the rotary body, i.e., herein, when inserting the first structure 10 into the second structure 20 toward the upstream side (see a white arrow in FIG. 1), portions of the first structure 10 and portions of the second structure 20 do not contact each other. Therefore, the labyrinth seal 100 according to the present embodiment can be assembled by inserting the rotary body into the stationary body in the axial direction.

Embodiment 2

Figure 2:
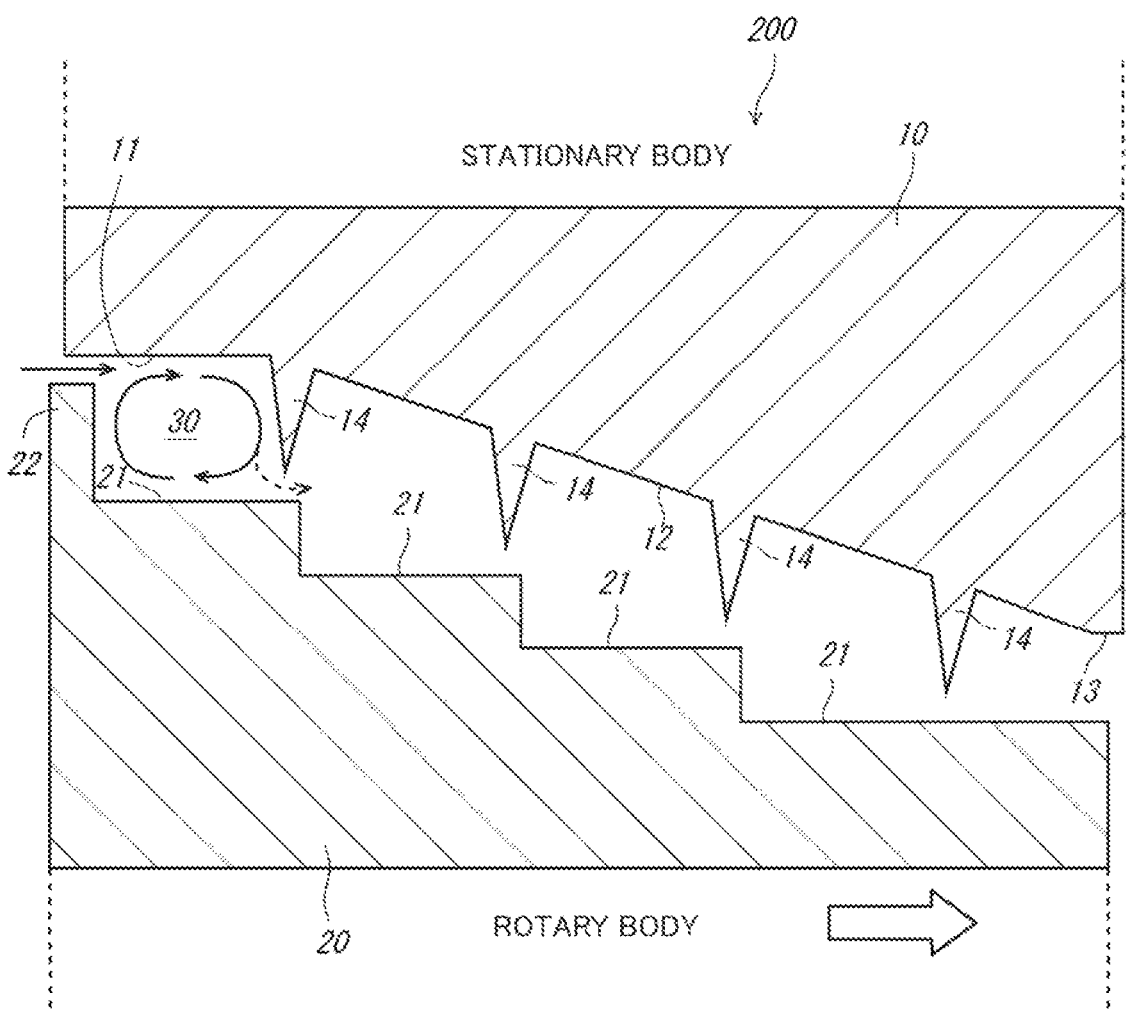
FIG. 2 is a sectional view of the labyrinth seal according to Embodiment 2.

Next, a labyrinth seal 200 according to Embodiment 2 will be described. FIG. 2 is a sectional view of the labyrinth seal 200 according to Embodiment 2 and corresponds to FIG. 1 of Embodiment 1. In FIG. 2, the same reference signs are used for the same components as in FIG. 1 and corresponding components to FIG. 1, and explanations of the above-described components are omitted.

The labyrinth seal 100 according to Embodiment 1 and the labyrinth seal 200 according to Embodiment 2 are different from each other in that: in Embodiment 1, the first structure 10 is located on the outer peripheral portion of the rotary body, and the second structure 20 is located on the inner peripheral portion of the stationary body: and in Embodiment 2, the first structure 10 is located on the inner peripheral portion of the stationary body, and the second structure 20 is located on the outer peripheral portion of the rotary body.

In the labyrinth seal 200 according to the present embodiment, unlike Embodiment 1, the inclined surface 12 is inclined such that the downstream portion thereof is located at the radially inner side of the upstream portion thereof. Moreover, the entirety of the step surfaces 21 is inclined so as to be located at the radially outer side as it extends toward the downstream side.

In the present embodiment, the inlet wall 22 included in the second structure 20 is located upstream of the most upstream seal fin 14, and the radial gap is between the inlet wall 22 and the first structure 10. Therefore, the large vortex of the gas is generated in the first space 30, and this can suppress the outflow of the gas from the first space 30.

Moreover, in the present embodiment, the second structure 20 is such that when each seal fin 14 is regarded as a reference, a portion of the second structure 20 which is located downstream of the seal fin 14 does not overlap the seal fin 14 when viewed in the axial direction. Therefore, when inserting the rotary body into the stationary body in the axial direction to assemble the stationary body and the rotary body, i.e., herein, when inserting the second structure 20 into the first structure 10 toward the downstream side (see a white arrow in FIG. 2), portions of the first structure 10 and portions of the second structure 20 do not contact each other.

Operational Advantages

The foregoing has described the labyrinth seal according to Embodiment 1 and the labyrinth seal according to Embodiment 2. As described above, the labyrinth seal according to each embodiment includes: a first structure including seal fins located at intervals in an axial direction: and a second structure opposed to the first structure, a radial gap being between each seal fin and the second structure. The second structure is such that when each seal fin is regarded as a reference, a portion of the second structure which is located downstream of the seal fin does not overlap the seal fin in the axial direction. The second structure includes an inlet wall located upstream of a most upstream one of the seal fins, a radial gap being between the inlet wall and the first structure.

According to this configuration, for example, when the first structure is located at the rotary body; and the second structure is located at the stationary body, portions of the first structure and portions of the second structure do not contact each other by inserting the rotary body into the stationary body toward the upstream side at the time of the assembling. Moreover, the gas having passed through the gap between the inlet wall and the first structure collides with the most upstream seal fin and then flows along the seal fin. With this, a large vortex of the gas is generated in a space between the inlet wall and the most upstream seal fin, and this suppresses the flow in the axial direction. In addition, it is unnecessary to unnecessarily increase the dimension of the gap between the inlet wall and the first structure. Therefore, the labyrinth seal according to the embodiment can be assembled by inserting the rotary body into the stationary body in the axial direction, and a leakage amount of gas can be effectively suppressed.

Moreover, in the labyrinth seal according to the embodiment, the first structure includes an inlet surface at a portion opposed to the inlet wall, and a radial position of the inlet surface is constant.

According to this configuration, even when relative positions of the first structure and the second structure in the axial direction slightly deviate from each other, the dimension of the radial gap between the inlet wall and the inlet surface does not change and is maintained constant.

Moreover, in the labyrinth seal according to the embodiment, a dimension of a radial gap between the inlet wall and the inlet surface is larger than a dimension of the radial gap between each seal fin and the second structure.

According to this configuration, since wear of the inlet wall and the inlet surface during operation is significantly reduced, the deterioration of the performance can be suppressed.

Moreover, in the labyrinth seal according to the embodiment, a radial dimension of the inlet wall is not less than two thirds of a radial distance between the first structure and the second structure in a region located downstream of the inlet wall and adjacent to the inlet wall.

According to this configuration, the vortex of the gas can be efficiently generated between the inlet wall and the most upstream seal fin.

Moreover, the gas turbine according to the embodiment includes the above-described labyrinth seal.

The invention claimed is:

1. A labyrinth seal comprising:
    a first structure including at least three seal fins located at intervals in an axial direction; and
    a second structure opposed to the first structure and including at least three step surfaces whose radial positions are different from each other, a radial gap being between each seal fin and a corresponding closest step surface, wherein:
    the second structure is such that when any one of the seal fins is regarded as a reference seal fin, a portion of the second structure which is located downstream of the reference seal fin does not overlap the reference seal fin when viewed in the axial direction;
    the second structure includes an inlet wall located upstream of a most upstream one of the seal fins, a radial gap being between the inlet wall and the first structure; and
    an axial position of each seal fin coincides with a downstream end portion of the corresponding closest step surface.

2. The labyrinth seal according to claim 1, wherein:
    the first structure includes an inlet surface at a portion opposed to the inlet wall; and
    a radial position of the inlet surface is constant.

3. The labyrinth seal according to claim 2, wherein a dimension of a radial gap between the inlet wall and the inlet surface is larger than a dimension of the radial gap between each seal fin and the second structure.

4. The labyrinth seal according to claim 1, wherein a radial dimension of the inlet wall is not less than two thirds of a radial distance between the first structure and the second structure in a region located downstream of the inlet wall and adjacent to the inlet wall.

5. A gas turbine comprising the labyrinth seal according to claim 1.

* * * * *